United States Patent [19]

Smith

[11] Patent Number: 4,650,160

[45] Date of Patent: Mar. 17, 1987

[54] VALVE WITH SEALED ACTUATOR ASSEMBLY

[75] Inventor: Robert T. Smith, Clawson, Mich.

[73] Assignee: Calflex Corporation, Southfield, Mich.

[21] Appl. No.: 663,968

[22] Filed: Oct. 23, 1984

[51] Int. Cl.⁴ .......................................... F16K 41/10
[52] U.S. Cl. ................................. 251/335.3; 251/214; 74/18.1
[58] Field of Search ................ 251/214, 335 B; 74/424.8 VA, 40, 18, 18.1

[56] References Cited

U.S. PATENT DOCUMENTS

| | | | |
|---|---|---|---|
| 2,526,825 | 10/1950 | Nier et al. | 251/22 |
| 2,607,233 | 5/1949 | Bosch | 74/18 |
| 2,659,569 | 4/1981 | Ehlke | 251/87 |
| 3,478,607 | 6/1968 | Arbeitlang | 74/18.1 |
| 3,782,685 | 1/1974 | Gallagher et al. | 251/306 |
| 4,462,422 | 7/1984 | Owoc et al. | 251/335 B |
| 4,468,002 | 8/1984 | Tremblay | 251/335 B |

FOREIGN PATENT DOCUMENTS

| | | | |
|---|---|---|---|
| 350865 | 6/1979 | Austria | 251/335 B |
| 356470 | 4/1980 | Austria | 251/335 B |

Primary Examiner—A. Michael Chambers
Attorney, Agent, or Firm—Lane & Aitken

[57] ABSTRACT

A sealed actuator assembly for a butterfly valve is disclosed in which the distal end of a bent actuator rod is journalled in a cap and the actuator is covered by a plurality of bellows. The bellows are welded to the valve, to each other, and to the cap so as to provide a watertight actuator assembly. Teflon ® rings are inserted into the bellows assembly at the joints between the bellows to assure clearance which reduces wear on areas of the bellows assembly between the rings and to reduce fatigue by facilitating the twisting of the bellows.

9 Claims, 3 Drawing Figures

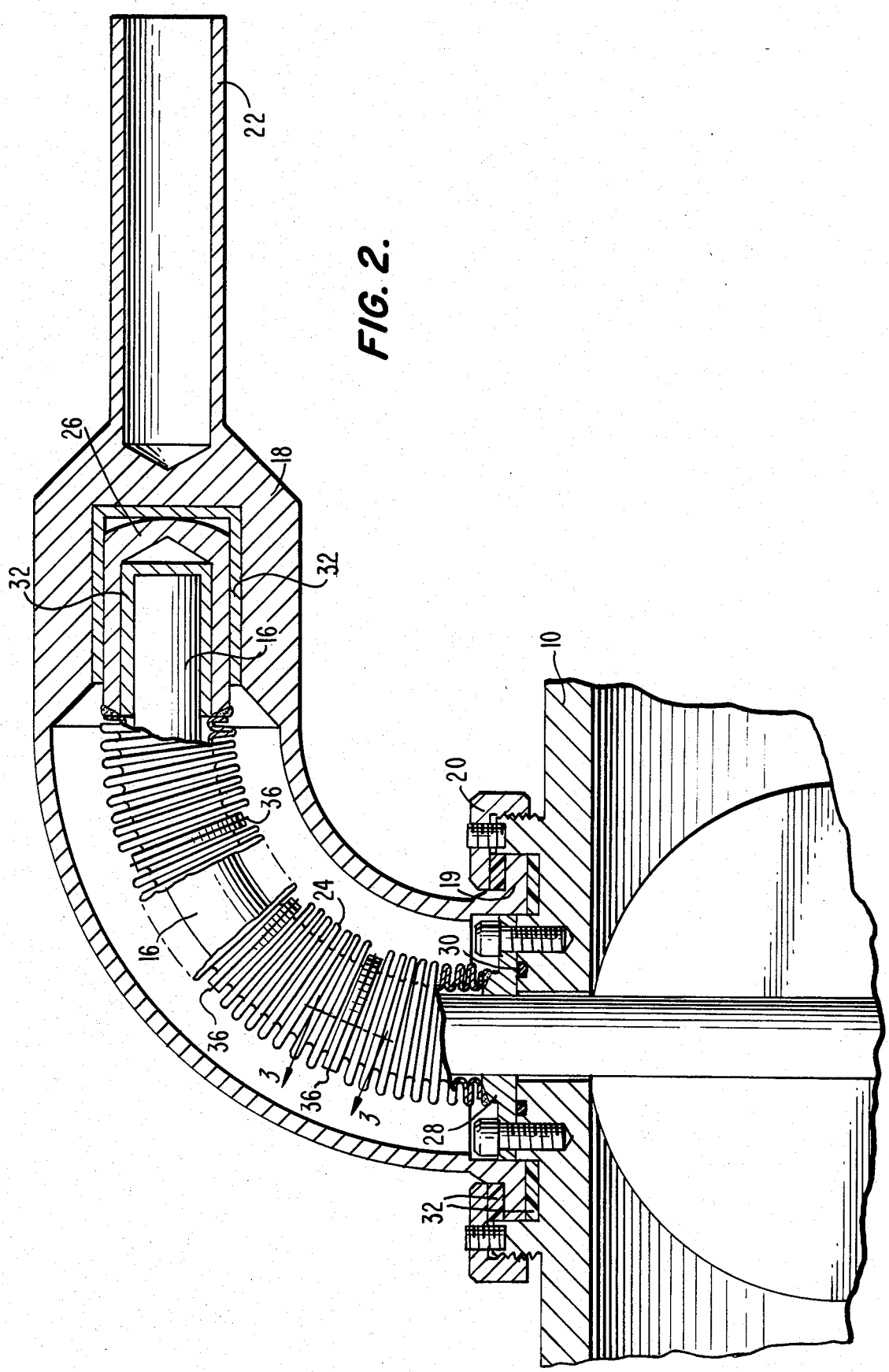

VALVE WITH SEALED ACTUATOR ASSEMBLY

BACKGROUND OF THE INVENTION

1. Field of the Invention

The present invention is directed generally to rotary valves having a wear-resistant seal between the valve stem and the body of the valve. More particularly, this invention is directed to valves for applications in which leakage-free operation is required over the life of the valve, such as nuclear power plants.

2. Description of Related Art

The use of flexible bellows, particularly thin-walled metal bellows to provide a seal between a valve body and valve actuator, such as the bellows disclosed in U.S. Pat. Nos. 2,659,569 and 3,782,685 is well-known in the art. However, since one end of the bellows is fixedly sealed to the valve body and the other end must move relative to the valve body during rotation, rotation causes the bellows to squirm. Friction and fatique induced by that squirming substantially reduce the useful life of the bellows.

SUMMARY OF THE INVENTION

Valve apparatus in accordance with the present invention comprises a housing having a flow control member that is rotated by a bent actuator. The bent actuator is encased in a water-tight bellows assembly. The distal end of the bellows assembly engages the actuator in a water-tight, sealed journal. The end of the bellows assembly proximate to the housing is fixedly sealed to the housing in a water-tight seal. Bearing means is positioned inside the bellows which engages the actuator when the actuator is rotated, thereby maintaining clearance between the bellows and the actuator.

DESCRIPTION OF THE DRAWINGS

The nature and advantages of the present invention will be more clearly understood when the description of a preferred embodiment given below is considered in conjunction with the drawings provided, in which:

FIG. 2 shows a cross section of the actuator shown in FIG. 1; and

In these drawings, similar structures have the same reference numerals.

DESCRIPTION OF A PREFERRED EMBODIMENT

Figure 1:
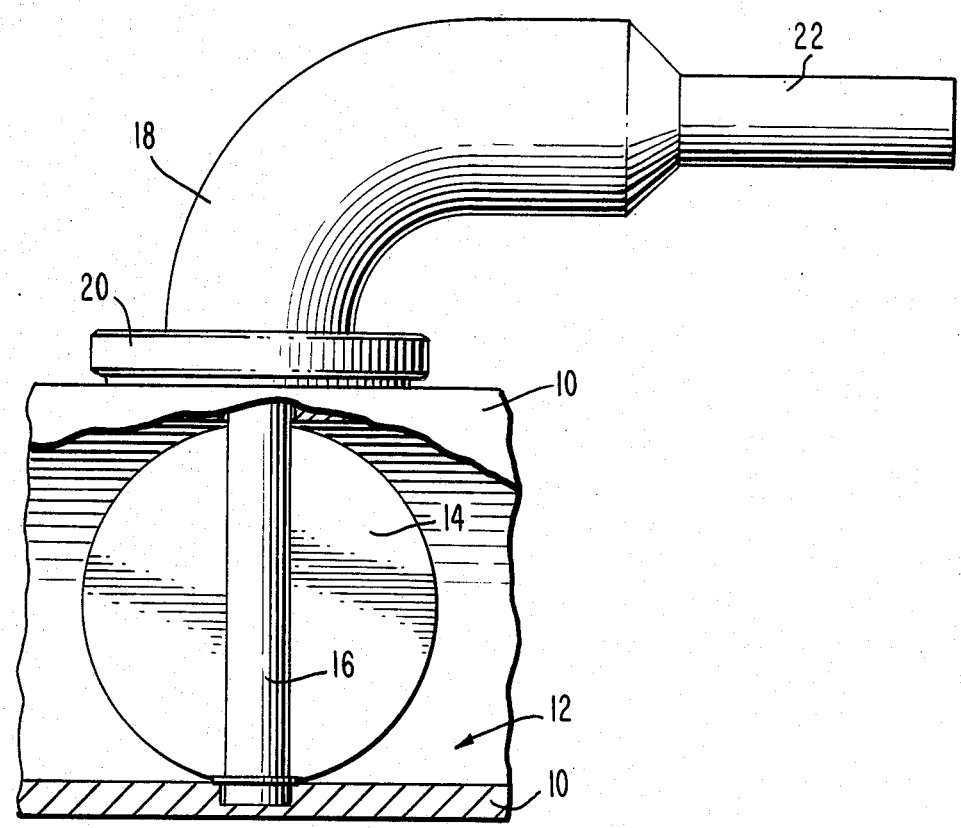
FIG. 1 is a diagram of butterfly valve apparatus in accordance with the present invention.
Figure 3:
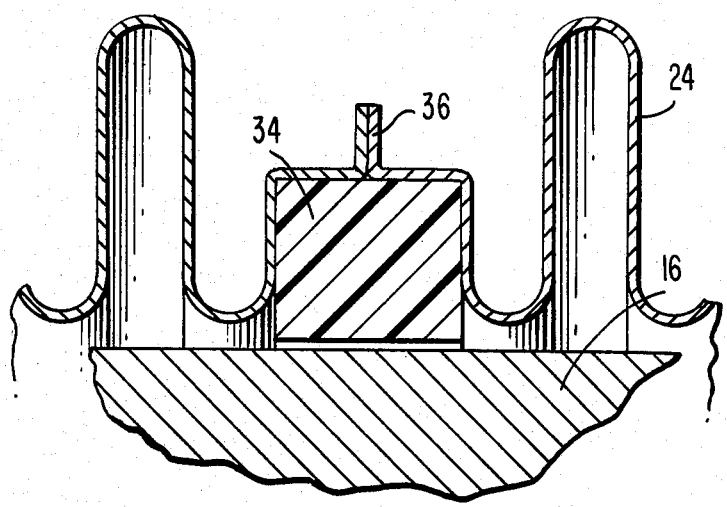
FIG. 3 shows a cross section of the bellows tube shown in FIG. 2 taken at the plane indicated at reference numeral 3 therein.

With reference to FIG. 1, valve apparatus in accordance with a preferred embodiment of the present invention is housed in a valve body 10 that is connected in a closed circulation system through which a contaminated fluid flows. A "butterfly" vane 14 adapted to control the flow of this fluid 12 through the valve body 10 is rotatably journalled therein. The vane 14 is mounted on a rod 16 which is encased in a right-angle elbow pipe 18. A flange 19 at one end of the pipe 18 is journalled in a collar 20 on the valve body 10. The other end of the pipe 18 is sealed and terminates in a handle 22.

With reference next to FIG. 2 it will be seen that the length of the rod 16 that extends beyond the valve body 10 is concentric with the pipe 18 and is encased in a series of bellows 24 which are affixed to a cap 26 at one end and a bearing 28 at the other. Preferably, the bellows are formed from thin-walled seamless metal tubes, and the cap 26 and bearing are also metal. All joints between these bellows 24 and between them and the cap 26 and bearing 28 are welded to provide a fixed, water-tight seal. Alternatively, such metal bellows may be formed of welded pipe, and soldering or other means may be used for forming a fixed water-tight metal to metal bond. The bearing 28 is tightly fastened onto the valve body 10 over an O-ring 30 which provides a fixed, water-tight seal at that joint. Thus, any fluid escaping from the valve body 10 through the joint between the rod 16 and bearing 28 remains contained within a bellows assembly that is sealed by welds or other fixed seals rather than sliding seals which permit movement, but are apt to leak.

The flange 19 on the pipe 18 is journalled in the collar 20 on the valve body 10 with a durable layer of low-friction material such at Teflon ® on its bearing surfaces to prevent wear. The rod is journalled inside the cap 26 with a second durable bearing surface of low-friction material 32 therebetween. The cap 26 is in turn journalled inside the sealed end of the pipe 18 with a third durable bearing surface of low-friction material 32 therebetween. The low-friction material on the second and third bearing surfaces permits the cap 26 to rotate relative to the pipe 18 and rod 16 when the pipe 18, rod 16 and vane 14 rotate relative to the valve body 10. This relative rotation of the cap 26 is caused by the "squirming" of the bellows 24 which are welded to the cap 26 which is free to move during this rotation and to the bearing 28 which is fixed in its position relative to the valve body 10.

The displacement of the bellows 24 relative to the pipe 18 during such squirming is limited by the diameter of the rod 16 inside the bellows 24 such that a point on a circumference of the bellows 24 will contact the rod 16 before a point on a nearby maximum circumference of the bellows 24 can contact the pipe 18. This prevents contact between the bellows and the pipe. A ring 34 of a low-friction material such as Teflon ®, is inserted at each joint 36 between the bellows before they are welded to reduce such contact between the rod 16 and the bellows 24. The ring 34 has an inner diameter larger than the diameter of the rod but smaller than the minimum inner diameter of the bellows from the ring 34 to the next adjacent joint 36. Thus the displacement of the bellows 24 is further limited by the contact of the rings 34 with the rod 16. This contact between the rings and the rod also prevents contact of the area of the bellows 24 adjacent those joints 36 with the rod 16 and reduces contact of the bellows 24 with the rod 16 in areas between the rings 34.

In valve apparatus in accordance with the present invention, a generally concentric alignment of the bellows and the actuator is maintained, despite the bellows' squirming, and this alignment prolongs the useful life of the bellows tubes by preventing abrasive wear. The insertion of one or more low-friction rings inside the bellows in accordance with the present invention also prolongs the life of the bellows by facilitating twisting of the bellows relative to the rod, which equalizes the distribution of stress and thereby minimizes metal fatigue in the bellows.

I claim:

1. Valve apparatus having a housing, a moveable flow control member in said housing, and an actuator assembly, said assembly comprising:
   a bent actuator connected to the flow control member for rotating the flow control member relative to the housing;
   at least two bellows encasing a part of the length of said actuator, said bellows including a first bellows and fixedly sealed to the housing in a water-tight seal and a second bellows that engages said actuator in a water-tight, sealed journal; and
   a ring of low-friction material at a joint between said bellows for maintaining clearance between said bellows and said actuator at said joint such that contact between said actuator and said bellows in the portion of said bellows between said ring and an end of said bellows is reduced, said bellows forming a water-tight seal at said joint, the inner surface of said ring being positioned and adapted to be engaged by said actuator when said flow control member is rotated by said bent actuator.

2. Valve apparatus as claimed in claim 1 wherein said water-tight, sealed journal is a water-tight cap fixedly sealed on said bellows assembly and enclosing the distal end of said bent actuator.

3. Valve apparatus as claimed in claim 1 wherein said bellows assembly is enclosed in a protective cover that is journalled on the housing and contacts said distal end of the bellows assembly.

4. Valve apparatus as claimed in claim 1 wherein said bearing means is a ring of low-friction material.

5. Valve apparatus having a housing, a moveable flow control member in said housing, and an actuator assembly, said actuator assembly comprising:
   a bent rod connected to said flow control member so that when said rod is turned relative to said housing the flow control member rotates relative to said housing;
   at least two metal bellows encasing a part of the length of said rod, said metal bellows comprising a first bellows proximate to the housing and affixed to the housing in a water-tight seal and a second bellows having a cap affixed to a distal end of said second bellows in a water-tight seal, said cap having an end of said bent rod journalled therein; and
   bearing means at the joint between said metal bellows for maintaining clearance between said metal bellows and said bent rod at said joint such that contact of a portion of said metal bellows between said bearing means at one end of said bellows and the other end of said bellows with said bent rod is reduced, said metal bellows forming a water-tight seal at said joint, said bearing means positioned and adapted to be engaged by said bent rod when said bent rod is turned.

6. Valve apparatus as claimed in claim 5, wherein said metal bellows are affixed to said cap and said housing, respectively, by welding.

7. Valve apparatus as claimed in claim 5, wherein said bent rod forms an oblique angle with its axis of rotation.

8. Valve apparatus as claimed in claim 5, wherein said bent rod forms about a right angle with its axis of rotation.

9. Valve apparatus having a housing, a moveable flow control member in said housing, and an actuator assembly, said actuator assembly comprising;
   a bent actuator connected to the flow control member for rotating the flow control member relative to the housing;
   a water-tight bellows assembly encasing a part of the length of said actuator, said bellows assembly having a first end proximate to the housing and fixedly sealed to the housing in a water-tight seal and a second, distal end that engages said actuator in a water-tight, sealed journal; and
   a ring of low-friction material inside said bellows assembly for maintaining clearance between said bellows assembly and said actuator so that contact between said actuator and said bellows assembly is reduced, the inner surface of said ring positioned and adapted to be engaged by said actuator when said flow control member is rotated by said bent actuator.

* * * * *